(12) United States Patent
Huang (10) Patent No.: US 10,818,268 B2
(45) Date of Patent: Oct. 27, 2020

(54) ADJUSTING A BRIGHTNESS OF A DISPLAY BASED ON AN IMAGE

(71) Applicant: Google LLC, Mountain View, CA (US)

(72) Inventor: Sianyi Huang, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/250,035

(22) Filed: Jan. 17, 2019

(65) Prior Publication Data
US 2020/0184925 A1     Jun. 11, 2020

Related U.S. Application Data

(60) Provisional application No. 62/776,223, filed on Dec. 6, 2018.

(51) Int. Cl.
G09G 5/00     (2006.01)
G09G 5/10     (2006.01)
G06T 5/00     (2006.01)

(52) U.S. Cl.
CPC ............... *G09G 5/10* (2013.01); *G06T 5/008* (2013.01); *G09G 2320/0646* (2013.01); *G09G 2360/144* (2013.01)

(58) Field of Classification Search
None
See application file for complete search history.

(56) References Cited

U.S. PATENT DOCUMENTS

| 7,102,648 | B1 * | 9/2006 | Holub | G06F 3/14 345/589 |
|---|---|---|---|---|
| 9,369,684 | B2 | 6/2016 | Lim et al. | |
| 9,445,011 | B2 * | 9/2016 | Zhang | B60R 1/088 |
| 9,485,398 | B2 * | 11/2016 | Patel | H04N 5/20 |
| 9,635,255 | B1 * | 4/2017 | Baldwin | H04N 5/2354 |
| 10,310,582 | B2 * | 6/2019 | Park | G06F 3/165 |
| 2001/0006377 | A1 * | 7/2001 | Kasahara | G09G 3/2022 345/60 |
| 2003/0085905 | A1 * | 5/2003 | Mori | G09G 3/22 345/589 |
| 2003/0122810 | A1 * | 7/2003 | Tsirkel | G09G 3/20 345/207 |
| 2004/0120576 | A1 * | 6/2004 | Kim | H04N 9/641 382/167 |
| 2005/0024522 | A1 * | 2/2005 | Nakami | H04N 1/6027 348/362 |
| 2005/0093850 | A1 * | 5/2005 | Mori | G09G 3/007 345/204 |
| 2007/0115302 | A1 * | 5/2007 | Huang | G09G 3/3208 345/690 |

(Continued)

*Primary Examiner* — Martin Mushambo
(74) *Attorney, Agent, or Firm* — Fish & Richardson P.C.

(57) ABSTRACT

Methods, systems, and apparatus, including computer programs encoded on a computer storage medium, for adjusting a brightness of a display based on an image. In one aspect, a method includes obtaining an image, determining an amount of brightness in the image, determining an amount of contrast in the image, determining a brightness gain that reflects an amount to adjust brightness of a display based on both the amount of brightness in the image and the amount of contrast in the image, adjusting the brightness of the display based on the brightness gain, and providing the image for output on the display with the brightness of the display adjusted in accordance with the brightness gain.

19 Claims, 7 Drawing Sheets

(56) References Cited

U.S. PATENT DOCUMENTS

| | | | |
|---|---|---|---|
| 2007/0268235 A1* | 11/2007 | Estevez | G09G 3/3406 345/102 |
| 2007/0286523 A1* | 12/2007 | Kim | G06T 5/009 382/274 |
| 2007/0291048 A1* | 12/2007 | Kerofsky | G09G 3/3406 345/589 |
| 2008/0284914 A1* | 11/2008 | Chen | H04N 9/77 348/645 |
| 2009/0002400 A1* | 1/2009 | Ha | G09G 3/3406 345/690 |
| 2009/0109129 A1* | 4/2009 | Cheong | G09G 5/02 345/20 |
| 2009/0109232 A1* | 4/2009 | Kerofsky | G09G 3/3406 345/589 |
| 2009/0109233 A1* | 4/2009 | Kerofsky | G09G 3/2003 345/589 |
| 2009/0109235 A1* | 4/2009 | Lin | G02B 7/36 345/589 |
| 2009/0115718 A1* | 5/2009 | Qiao | G09G 3/3426 345/102 |
| 2009/0225201 A1* | 9/2009 | Abe | G06T 5/009 348/241 |
| 2009/0231440 A1* | 9/2009 | Lai | G09G 3/3406 348/207.1 |
| 2010/0053222 A1* | 3/2010 | Kerofsky | G09G 3/3406 345/690 |
| 2010/0080459 A1* | 4/2010 | Dai | G06T 5/009 382/170 |
| 2010/0253715 A1* | 10/2010 | Odawara | G09G 3/3233 345/690 |
| 2011/0012937 A1* | 1/2011 | Onishi | G09G 3/3426 345/690 |
| 2011/0069098 A1* | 3/2011 | Lee | G09G 3/3225 345/691 |
| 2012/0007880 A1* | 1/2012 | Huang | G09G 3/3406 345/617 |
| 2012/0188262 A1* | 7/2012 | Rabii | G09G 5/393 345/534 |
| 2012/0327051 A1* | 12/2012 | Davies | G09G 5/10 345/207 |
| 2013/0114043 A1* | 5/2013 | Balan | G02B 27/017 351/210 |
| 2013/0141351 A1* | 6/2013 | Aisaka | G09G 5/10 345/173 |
| 2014/0370872 A1* | 12/2014 | Xia | G06F 3/0481 455/418 |
| 2015/0070337 A1* | 3/2015 | Bell | G09G 3/2096 345/207 |
| 2015/0163396 A1* | 6/2015 | Kudo | H04N 5/23212 348/239 |
| 2015/0181186 A1* | 6/2015 | Lim | G06T 5/40 348/712 |
| 2015/0325206 A1* | 11/2015 | Zhang | G09G 5/10 345/690 |
| 2015/0371605 A1* | 12/2015 | Wu | G09G 5/02 345/604 |
| 2016/0028965 A1* | 1/2016 | Horii | H04N 5/2351 348/333.01 |
| 2016/0125221 A1* | 5/2016 | Kim | G06K 9/00912 382/117 |
| 2016/0189634 A1* | 6/2016 | Kim | G09G 3/3406 345/691 |
| 2017/0039994 A1* | 2/2017 | Wu | G09G 5/10 |
| 2017/0061843 A1* | 3/2017 | Zhao | G09G 3/2003 |
| 2017/0110065 A1* | 4/2017 | Zhang | G09G 3/2018 |
| 2017/0111975 A1* | 4/2017 | Lee | H05B 47/155 |
| 2017/0237889 A1* | 8/2017 | Wang | H04N 5/2354 348/135 |
| 2017/0345392 A1* | 11/2017 | Matsubayashi | H04N 5/20 |
| 2018/0032815 A1* | 2/2018 | Lee | G06K 9/00604 |
| 2019/0295477 A1* | 9/2019 | Tada | G09G 3/36 |

\* cited by examiner

ADJUSTING A BRIGHTNESS OF A DISPLAY BASED ON AN IMAGE

CROSS-REFERENCE TO RELATED APPLICATION

This application claims the benefit of U.S. Application No. 62/776,223, filed Dec. 6, 2018, the contents of which are incorporated by reference herein.

BACKGROUND

Electronic devices may include displays on which images may be shown.

SUMMARY

This document describes techniques, methods, systems, and other mechanisms for adjusting a brightness of a display based on an image. Displays of electronic devices are frequently used to show images. For example, a user of a mobile computing device may view images stored in a photo album on the mobile computing device or may view an image that was just captured using a camera of the mobile computing device.

In some cases, an electronic device may make adjustments when displaying images. For example, an image to be displayed may have low contrast and be very dark, so the electronic device may modify the image by increasing a brightness of all the pixels in the image by 40% and then display the modified image. Increasing the brightness of all the pixels may increase contrast within the image and enhance details as differences in brightness between darker and lighter pixels may be emphasized. Additionally or alternatively, local tone mapping may be used to adjust various pixels in the image to enhance details.

However, modifying images themselves may provide limited benefit in some cases. For example, increasing a brightness of all pixels in a bright image with low contrast may have limited effect as the pixels in the bright image may already be at or near a maximum. Accordingly, increasing a brightness of all pixels in some images may actually decrease contrast in the image. Similarly, performing local tone mapping on a bright image may not substantially increase contrast in the image.

To overcome deficiencies in modifying images alone, an electronic device may adjust a brightness of a display that outputs the image. For example, when displaying a bright image, an electronic device may increase a brightness of its display from 60% to 90% without modifying the image itself. In another example, when displaying a dark image, the electronic device may modify the image to increase brightness without increasing a brightness of its display. Adjusting a brightness of the display may be done through a display driver integrated circuit. For example, a display driver integrated circuit may increase a brightness of a display from 60% to 90% by increasing power provided to drive the display by 50%.

A brightness of a display may refer to a setting that is applied to the entire display and determines how bright things are determined on the display. For example, a brightness of 10% for a display may mean that a maximum brightness of all pixels of the display is sixty nits and a brightness of 100% for a display may mean that a maximum brightness of all pixels of the display is six hundred nits. In the example, when a display is at a brightness of 10% so the maximum brightness of all pixels is sixty nits, pixels of the display may range from zero to sixty nits depending on what is being displayed for each of the pixels. In another example, when a display is at a brightness of 100% so the maximum brightness of all pixels is six hundred nits, pixels of the display may range from zero to six hundred nits depending on what is being displayed for each of the pixels.

Accordingly, increasing a brightness of a display based on an image may allow for enhancement of details in the image where modifying the image alone may be limited in enhancing details. In some implementations, an electronic device may both increase a brightness of a display based on an image and modify the image to leverage benefits of both approaches. For example, an image may be modified with local tone mapping to improve contrast in dark areas, the brightness of the display may be increased, and then the local tone mapped image may be displayed on the display with the brightness increased.

One innovative aspect of the subject matter described in this specification is embodied in a method that includes the actions of obtaining an image, determining an amount of brightness in the image, determining an amount of contrast in the image, determining a brightness gain that reflects an amount to adjust brightness of a display based on both the amount of brightness in the image and the amount of contrast in the image, adjusting the brightness of the display based on the brightness gain, and providing the image for output on the display with the brightness of the display adjusted in accordance with the brightness gain.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects adjusting the brightness of the display based on the brightness gain includes increasing the brightness of the display without changing data that represents the image. In certain aspects, adjusting the brightness of the display based on the brightness gain includes increasing an amount of power provided to the display based on the brightness gain. In some implementations, providing the image for output on the display with the brightness of the display adjusted in accordance with the brightness gain includes generating a local tone mapped image from the image, and providing the local tone mapped image for output on the display with the brightness of the display adjusted in accordance with the brightness gain.

In some aspects, determining a brightness gain that reflects an amount to adjust brightness of a display based on both the amount of brightness in the image and the amount of contrast in the image includes determining an amount of brightness of an environment of the display and determining the brightness gain that reflects the amount to adjust brightness of the display based on (i) the amount of brightness in the image, (ii) the amount of contrast in the image, and (iii) the amount of brightness of the environment of the display. In certain aspects, determining a brightness gain that reflects an amount to adjust brightness of a display based on both the amount of brightness in the image and the amount of contrast in the image includes determining an adjusted amount of brightness in the image based on the amount of contrast in the image and determining the brightness gain from the adjusted amount of brightness in the image.

In some implementations, determining an amount of brightness in the image includes determining an average of brightnesses of each pixel in the image. In some aspects, determining an amount of contrast in the image includes determining an amount of variance in brightnesses for pixels in the image. In certain aspects, determining an amount of contrast in the image includes determining an amount of dark pixels in the image and an amount of light pixels in the image satisfies contrast level criteria for a particular contrast level. In some implementations, determining an amount of dark pixels and an amount of light pixels in the image satisfies contrast level criteria for a particular contrast level includes determining a high amount of contrast in the image in response to determining a percentage of pixels that are dark in the image and a percentage of pixels that are light in the image are both greater than a particular threshold.

In certain aspects, determining an amount of dark pixels and an amount of light pixels in the image satisfies contrast level criteria for a particular contrast level includes determining a low amount of contrast in the image based on determining a percentage of pixels that are dark in the image is less than a particular threshold and the percentage of pixels that are light in the image is above the particular threshold. In some aspects, determining an amount of dark pixels and an amount of light pixels in the image satisfies contrast level criteria for a particular contrast level includes determining a medium amount of contrast in the image in response to determining a percentage of pixels that are dark in the image is less than a particular threshold and the percentage of light pixels is less than the particular threshold.

In some implementations, actions include determining that the image is no longer to be output on the display and in response to determining that the image is no longer to be output on the display, adjusting the brightness of the display to the brightness of the display before the image was output.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

FIGS. 1A-1D are conceptual diagrams of a system 100 for adjusting a brightness of a display based on an image. The system 100 includes an image luma determinator 110 that may determine an amount of brightness in an image, e.g., determine luma level in the image, a contrast determinator 120 that may determine an amount of contrast in the image, e.g., determine contrast level in the image, a brightness gain determinator 130 that may determine a brightness gain based on the amount of brightness determined in the image and the amount of contrast determined in the image, and a display brightness adjuster 140 that may adjust a brightness of the display 150 based on the brightness gain that is determined. The system 100 may be incorporated in an electronic device such as a mobile computing device, a tablet, a laptop computer, desktop computer, or some other computing device.

Figure 1A:
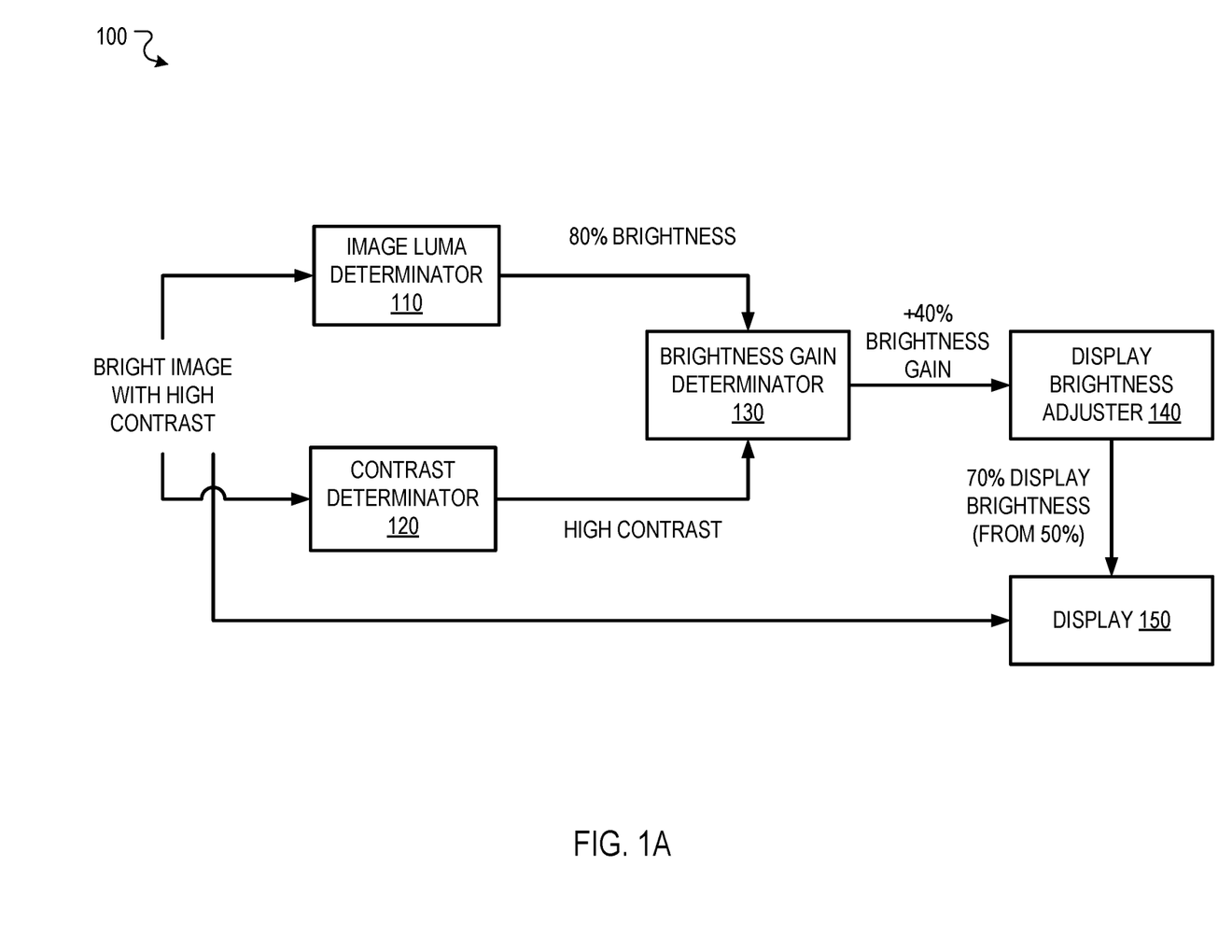
FIGS. 1A-1D are conceptual diagrams of a system for adjusting a brightness of a display based on an image.
Figure 1B:
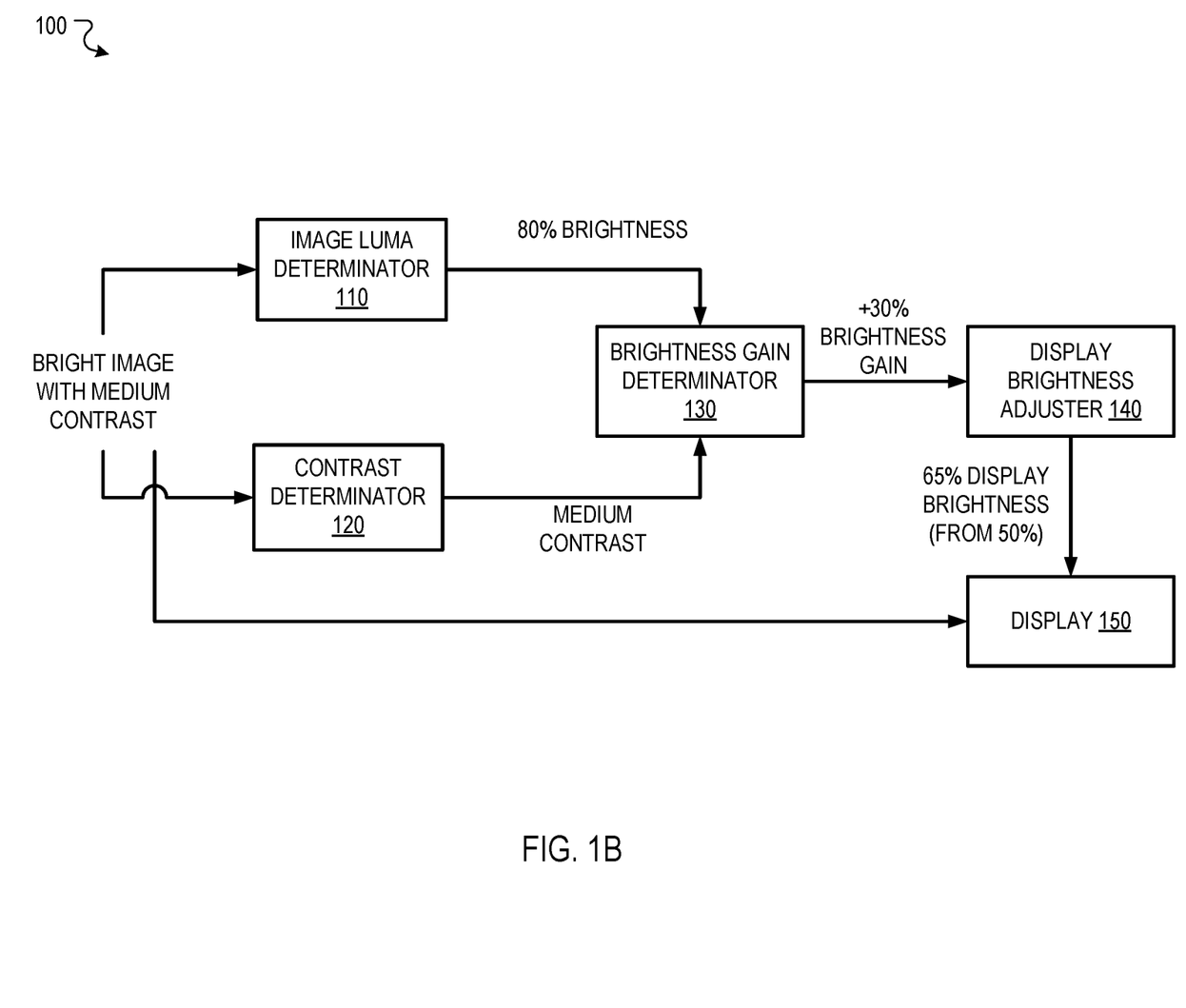
Figure 1C:
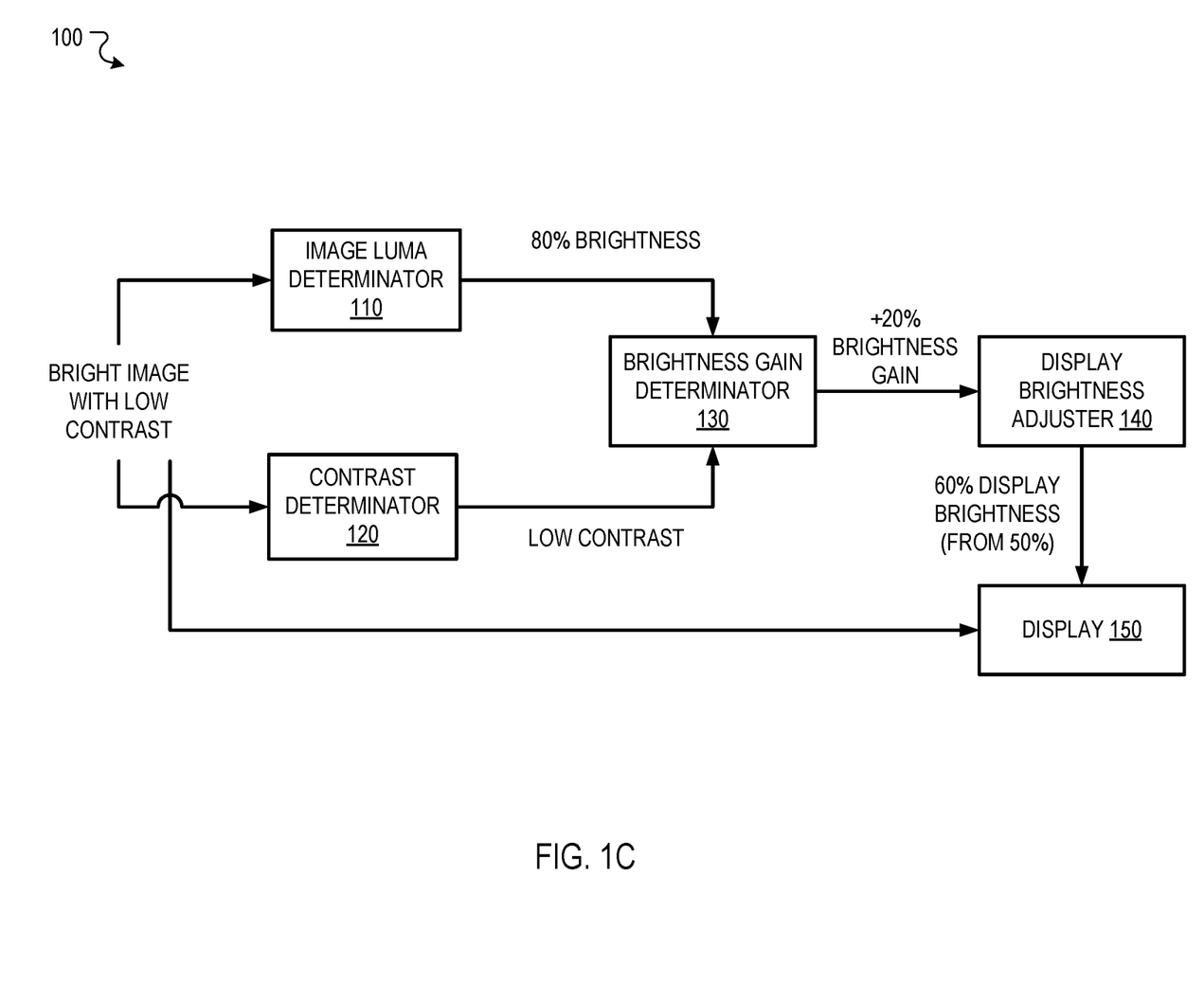
Figure 1D:
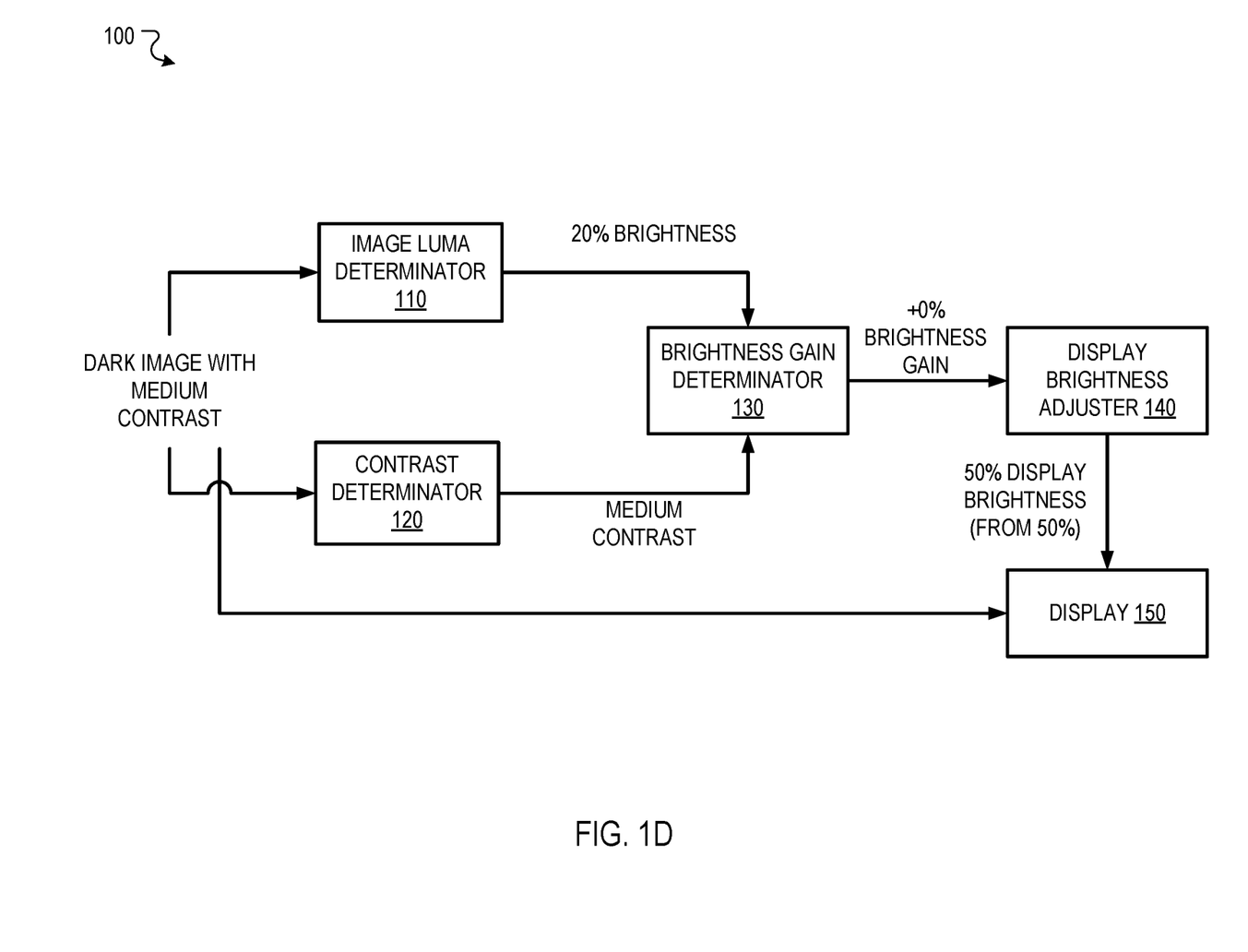

FIG. 1A illustrates an example where, response to displaying a bright image with high contrast, the system 100 increases a display brightness, also referred to as brightness of a display, by 40% from 50% to 70% in. FIG. 1B illustrates an example where, in response to displaying a bright image with medium contrast, the system 100 increases a display brightness by 30% from 50% to 65%. FIG. 1C illustrates an example where, in response to displaying a bright image with low contrast, the system 100 increases a display brightness by 20% from 50% to 60%. FIG. 1D illustrates an example where, in response to displaying a dark image with medium contrast, the system 100 does not increase a display brightness.

The image luma determinator 110 may determine an amount of brightness in an image. For example, the image luma determinator 110 may determine 80% brightness in an image where an average value of brightness of each pixel in the image is two hundred and four out of a maximum of two hundred fifty five. In another example, the image luma determinator 110 may determine 20% brightness in an image where an average value of brightness of each pixel in the image is fifty one out of a maximum of two hundred fifty five.

The image luma determinator 110 may determine an amount of brightness in an image by analyzing each pixel in the image. The image luma determinator 110 may determine an average value of each pixel in the image and determine the amount of brightness for the image from the average value of each pixel. Each pixel in each image may have a red value, a blue value, and a green value (RGB values), and the image luma determinator 110 may determine the average value of all the RGB values in the pixels of the image. For example, the image luma determinator 110 may determine an average value of two hundred and four for the RGB values of all the pixels in the image.

The image luma determinator 110 may provide an output that indicates the amount of brightness determined for an image. For example, the image luma determinator 110 may output 80% or two hundred and four, where both indicate that an average value of brightness for pixels in an image was two hundred and four out of a maximum brightness value of two hundred fifty five.

The contrast determinator 120 may determine an amount of contrast in the image. For example, the contrast determinator 120 may determine a low, medium, or high amount of contrast in the image. The contrast determinator 120 may determine an amount of contrast in the image based on an amount of pixels that are dark and an amount of pixels that are light. A pixel that is dark, also referred to as a dark pixel, may be considered a pixel with an average RGB value of less than sixty, eight five, one hundred, or some other value. A pixel that is light, also referred to as a light pixel, may be considered a pixel with an average RGB value of greater than one hundred fifty, one hundred seventy, one hundred eighty five, or some other value.

The contrast determinator 120 may determine that an image with a high amount of light pixels and a low amount of dark pixels, or vice versa, has low contrast, an image with a medium amount of light pixels and a medium amount of dark pixels has high contrast, and an image with a medium amount of light pixels and a low amount of dark pixels, or vice versa, has medium contrast. For example, the contrast determinator 120 may determine that an image with 90% light pixels and 10% dark pixels is low contrast, an image with 10% light pixels and 90% dark pixels is low contrast, an image with 30% light pixels and 30% dark pixels is high contrast, an image with 30% light pixels and 10% dark pixels is medium contrast, and an image with 10% light pixels and 30% dark pixels is medium contrast.

The contrast determinator 120 may provide an output that indicates the amount of contrast determined for an image. For example, the contrast determinator 120 may output "low," "medium," or "high," to indicate low contrast, medium contrast, or high contrast, respectively. In another example, the contrast determinator 120 may output "33%," "66%," or "100%," to indicate low contrast, medium contrast, or high contrast, respectively.

The brightness gain determinator 130 may determine a brightness gain based on the amount of brightness determined in the image and the amount of contrast determined in the image. For example, the image luma determinator 130 may receive an indication of 80% brightness from the image luma determinator 110 and an indication of high contrast from the contrast determinator and, in response, determine a brightness gain of 40%.

In another example, the image luma determinator 130 may receive an indication of 80% brightness from the image luma determinator 110 and an indication of medium contrast from the contrast determinator and, in response, determine a brightness gain of 30%. In yet another example, the image luma determinator 130 may receive an indication of 80% brightness from the image luma determinator 110 and an indication of low contrast from the contrast determinator and, in response, determine a brightness gain of 20%.

In still another example, the image luma determinator 130 may receive an indication of 20% brightness from the image luma determinator 110 and an indication of medium contrast from the contrast determinator and, in response, determine a brightness gain of 0%. Generally, the brightness gain determinator 130 may determine a higher brightness gain for images that are brighter and, as a lesser effect, higher brightness gain for images with more contrast.

The brightness gain determinator 130 may output an indication of the brightness gain determined by the brightness gain determinator 130. For example, the brightness gain determinator 130 may output an indication of "40%," "+0.4," or "140%" to indicate an increase of 40% in brightness of the display 150. In another example, the brightness gain determinator 130 may output an indication of "30%," "+0.3," or "130%" to indicate an increase of 30% in brightness of the display 150.

The display brightness adjuster 140 may adjust a brightness of the display 150 based on the brightness gain determined by the brightness gain determinator 130. For example, the display brightness adjuster 140 may receive an indication 40% and, in response, increase an existing display brightness of 50% to 70%. In another example, the display brightness adjuster 140 may receive an indication 30% and, in response, increase an existing display brightness of 50% to 65%. In still another, the display brightness adjuster 140 may receive an indication 20% and, in response, increase an existing display brightness of 50% to 60%.

The display brightness adjuster 140 may adjust a brightness of the display 150 by changing an amount of power provided to the display 150. For example, the display brightness adjuster 140 may adjust a brightness of the display 150 by 40% by increasing an amount of power output by a display driver integrated circuit by 40%. For a Liquid Crystal Display (LCD), a brightness gain adjustment of 40% may include a display driver IC sending a signal to a backlight driver IC to increase power. For an Active-Matrix Organic Light-Emitting Diode (AMO-LED), adjusting a brightness gain adjustment of 40% may include a display driver IC automatically requesting an Organic Light Emitting Diode circuit manipulate in a higher power condition for higher brightness.

Figure 2:
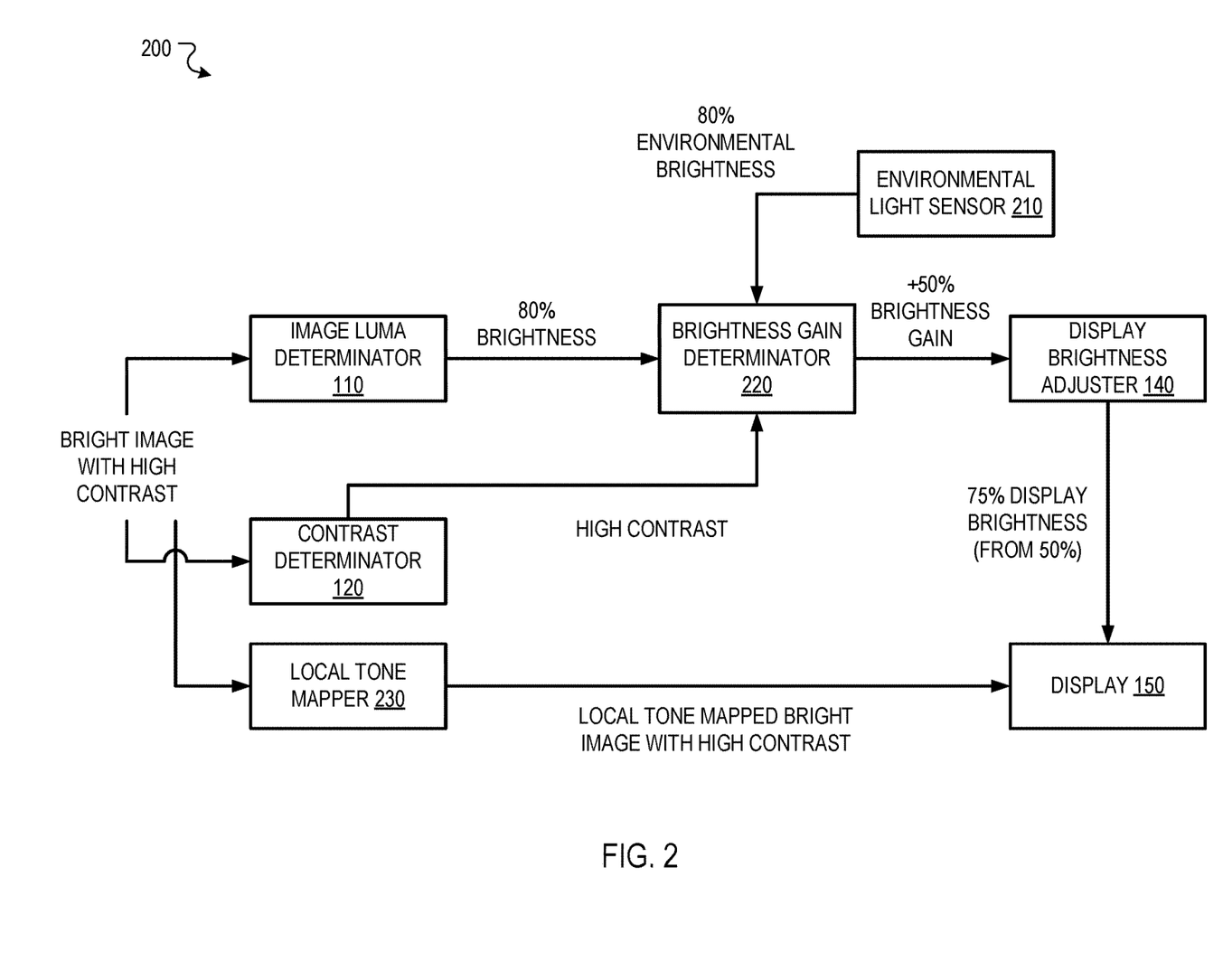
FIG. 2 is a conceptual diagram of an alternative system for adjusting a brightness of a display based on an image.

FIG. 2 is a conceptual diagram of an alternative system 200 for adjusting a brightness of a display based on an image. The system 200 may include similar components to system 100 with the addition of an environmental light sensor 210 that indicates an amount of environmental light, a local tone mapper 230 that performs local tone mapping, and replacing the brightness gain determinator 130 with a brightness gain determinator 220 that additionally determines a brightness gain based on the amount of environmental light.

The environmental light sensor 210 may be a sensor that detects light in an environment. For example, the environmental light sensor 210 may be a photodiode that converts light absorbed by the photodiode into electrical current. The environmental light sensor 210 may provide an indication of an amount of light in an environment. For example, the environmental light sensor 210 in a mobile computing device being used under direct bright sunlight may indicate an amount of 100% light in the environment. In another example, the environmental light sensor 210 in a mobile computing device being used under indoor lighting may indicate an amount of 30% light in the environment.

The brightness gain determinator 220 may determine the brightness gain based on the amount of brightness in an image, the amount of contrast in an image, and the amount of environmental light. Generally, the brightness gain determinator 220 may increase brightness gain more under brighter environmental light and increase brightness gain less under less bright environmental light. Accordingly, use of the amount of light in the environment as detected by the environmental light sensor 210 may help make an image displayed on the display 150 more visible when viewed under brighter light.

For example, the brightness gain determinator 220 may receive from the image luma determinator 110 an indication of 80% brightness in an image, receive from the contrast determinator 120 an indication of high contrast, receive from the environmental light sensor 210 an indication of 80% environmental brightness, and, in response, determine a brightness gain of 50%. In another example, the brightness gain determinator 220 may receive from the image luma determinator 110 an indication of 80% brightness in an image, receive from the contrast determinator 120 an indication of high contrast, receive from the environmental light sensor 210 an indication of 30% environmental brightness, and, in response, determine a brightness gain of 40%.

Figure 3:
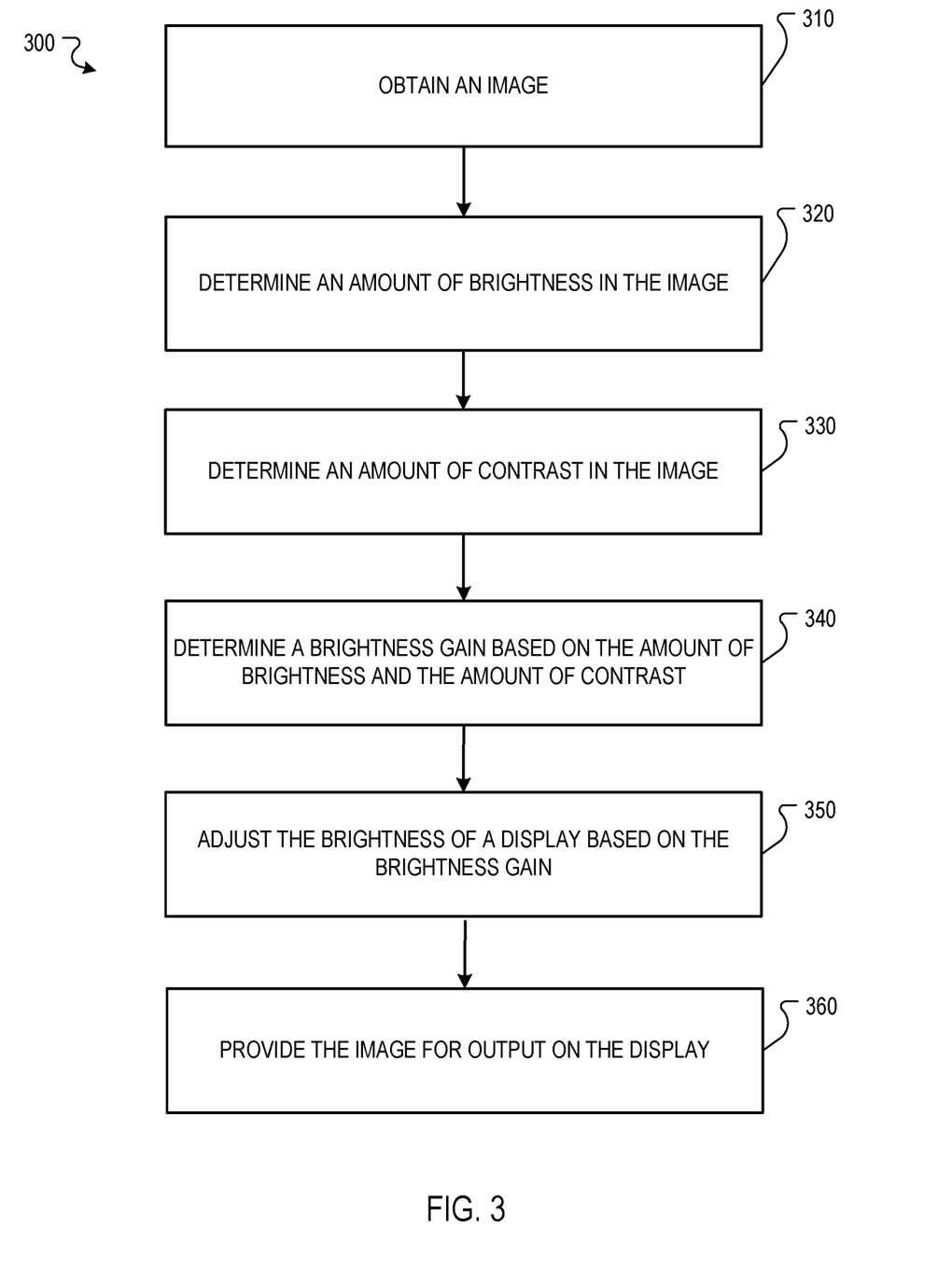
FIG. 3 is a flow diagram that illustrates an example of a process for adjusting a brightness of a display based on an image.

FIG. 3 is a flow diagram that illustrates an example of a process 300 for adjusting a brightness of a display based on an image. The operations of the process 300 may be performed by system 100 or other systems.

The process 300 includes obtaining an image (310). For example, the system 100 may access an image from storage and provide the image to the image luma determinator 110 and the contrast determinator 120. The image may be accessed from a photo album stored on a mobile computing device that includes the system 100 or obtained from a camera of the mobile computing device.

The process 300 includes determining an amount of brightness in the image (320). For example, the image luma determinator 110 may determine 80% brightness in an image. In some implementations, determining an amount of brightness in the image includes determining an average of brightnesses of each pixel in the image. For example, the image luma determinator 110 may obtain an image histogram that indicates a frequency of RGB values for the pixels in an image and determine an average of all the RGB values as the amount of brightness in the image.

The process 300 includes determining an amount of contrast in the image (330). For example, the contrast determinator 120 may determine high contrast in an image. In some implementations, determining an amount of contrast in the image includes determining an amount of dark pixels in the image and an amount of light pixels in the image satisfies contrast level criteria for a particular contrast level. For example, the contrast determinator 120 may determine high contrast based on the amount of dark pixels and light pixels satisfying criteria for high contrast, medium contrast based on the amount of dark pixels and light pixels satisfying criteria for medium contrast, and low contrast based on the amount of dark pixels and light pixels satisfying criteria for low contrast.

In some implementations, determining an amount of dark pixels and an amount of light pixels in the image satisfies contrast level criteria for a particular contrast level includes determining a high amount of contrast in the image in response to determining a percentage of pixels that are dark in the image and a percentage of pixels that are light in the image are both greater than a particular threshold. For example, the contrast determinator 120 may determine a high amount of contrast based on determining that a percentage of dark pixels and light pixels in an image are each above 30%.

In some implementations, determining an amount of dark pixels and an amount of light pixels in the image satisfies contrast level criteria for a particular contrast level includes determining a low amount of contrast in the image based on determining a percentage of pixels that are dark in the image is less than a particular threshold and the percentage of pixels that are light in the image is above the particular threshold. For example, the contrast determinator 120 may determine a low amount of contrast based on determining that a percentage of dark pixels is less than 10% and a percentage of light pixels in an image is above 90%.

In some implementations, determining an amount of dark pixels and an amount of light pixels in the image satisfies contrast level criteria for a particular contrast level includes determining a medium amount of contrast in the image in response to determining a percentage of pixels that are dark in the image is less than a particular threshold and the percentage of light pixels is less than the particular threshold. For example, the contrast determinator 120 may determine a medium amount of contrast based on determining that a percentage of dark pixels and light pixels are each less than 30%.

In some implementations, determining an amount of contrast in the image includes determining an amount of variance in brightnesses for pixels in the image. For example, the contrast determinator 120 may determine a standard deviation of RGB values for pixels in the image where zero is a minimum and two hundred fifty five is a maximum, and determine low contrast if a standard deviation is less than ten, determine medium contrast if a standard deviation is ten or more but less than thirty, and determine high contrast if a standard deviation is thirty or more.

The process 300 includes determining a brightness gain based on the amount of brightness in the image and the amount of contrast in the image (340). For example, the brightness gain determinator 130 may determine a brightness gain of 40% based on 80% brightness in the image and high contrast in the image.

In some implementations, determining a brightness gain that reflects an amount to adjust brightness of a display based on both the amount of brightness in the image and the amount of contrast in the image includes determining an amount of brightness of an environment of the display and determining the brightness gain that reflects the amount to adjust brightness of the display based on (i) the amount of brightness in the image, (ii) the amount of contrast in the image, and (iii) the amount of brightness of the environment of the display. For example, the brightness gain determinator 220 may determine a brightness gain of 50% based on 80% brightness in the image, high contrast in the image, and 80% environmental brightness.

In some implementations, determining a brightness gain that reflects an amount to adjust brightness of a display based on both the amount of brightness in the image and the amount of contrast in the image includes determining an adjusted amount of brightness in the image based on the amount of contrast in the image and determining the brightness gain from the adjusted amount of brightness in the image. For example, the brightness gain determinator 130 may determine an adjusted amount of brightness of 90% based on a high amount of contrast in an image and an amount of brightness of 80%, and determine a brightness gain of 40% from the adjusted amount. In another example, the brightness gain determinator 130 may determine an adjusted amount of brightness of 90% based on a medium amount of contrast in an image and an amount of brightness of 85%, and determine a brightness gain of 40% from the adjusted amount.

The process 300 includes adjusting the brightness of a display based on the brightness gain (350). For example, the display brightness adjuster 140 may adjust the brightness of the display 150. In some implementations, adjusting the brightness of the display based on the brightness gain includes increasing the brightness of the display without changing data that represents the image. For example, the system 100 may not change RGB values of the image while increasing nits of the pixels in the display 150 that show the pixels of the image.

In some implementations, adjusting the brightness of the display based on the brightness gain includes increasing an amount of power provided to the display based on the brightness gain. For example, the display brightness adjuster 140 may increase a power used to drive the display 150 by 50% to increase a brightness of 50% without changing RGB values of pixels of an image.

The process 300 includes providing the image for output on the display (360). For example, the image may be output on the display 150. In some implementations, providing the image for output on the display with the brightness of the display adjusted in accordance with the brightness gain includes generating a local tone mapped image from the image and providing the local tone mapped image for output on the display with the brightness of the display adjusted in accordance with the brightness gain. For example, the local tone mapper 230 may obtain an image and adjust RGB values of pixels in the image and then provide the local tone mapped image with adjusted RGB values to the display 150 for output after the brightness of the display is increased by 50%.

In some implementations, the process 300 may include determining that the image is no longer to be output on the display and, in response, adjusting the brightness of the display to the brightness of the display before the image was output. For example, the display brightness adjuster 140 may determine that the image is no longer to be displayed and, in response, adjust the display brightness from 70% back to 50%, reversing a 40% brightness gain.

Figure 4:
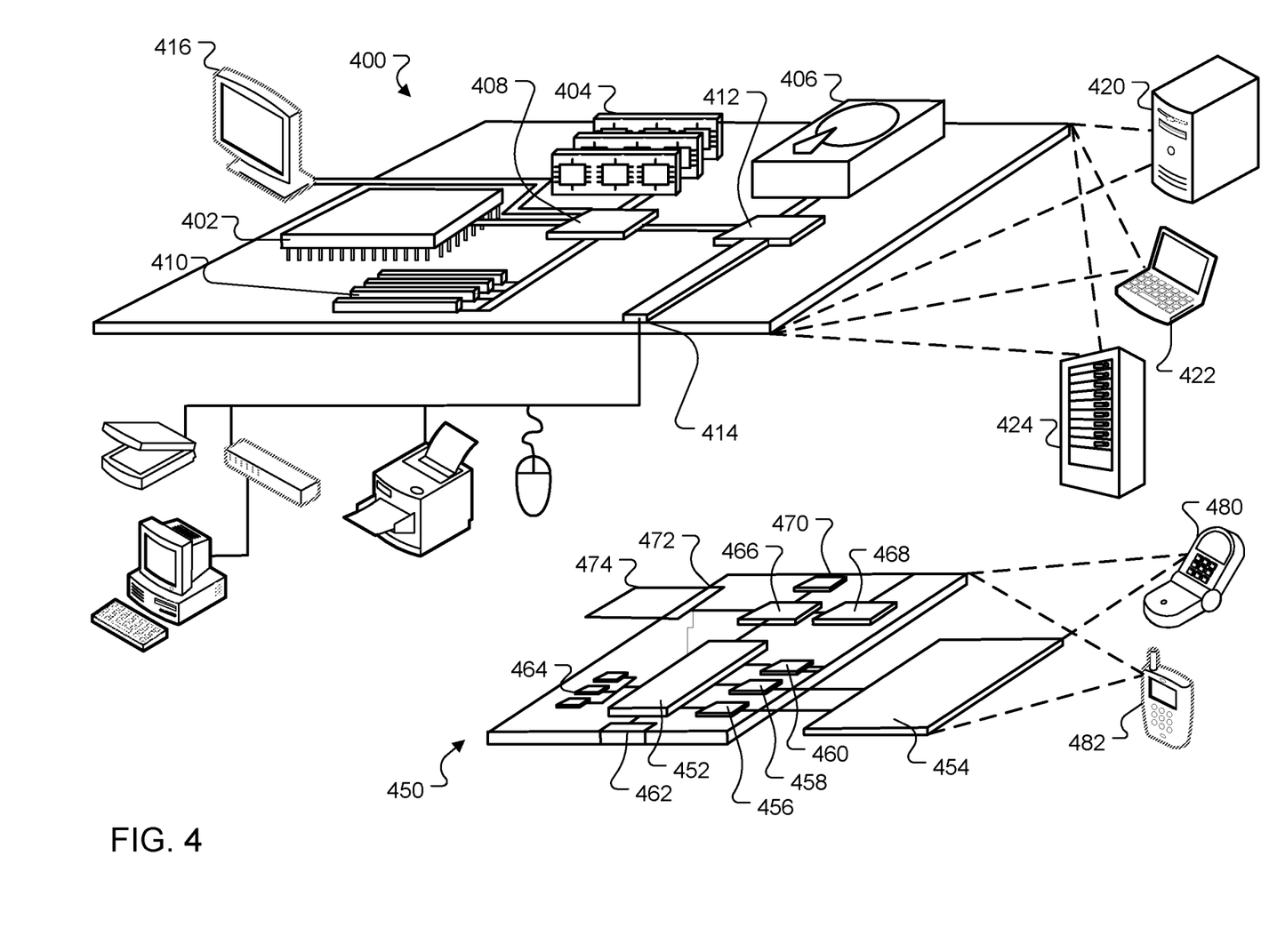
FIG. 4 is a block diagram of examples of computing devices that may be used to implement the systems and methods described in this document.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
obtaining an image;
determining an amount of brightness in the image;
determining an amount of contrast in the image, including determining an amount of dark pixels in the image and an amount of light pixels in the image satisfies contrast level criteria for a particular contrast level;
determining a brightness gain that reflects an amount to adjust brightness of a display based on both the amount of brightness in the image and the amount of contrast in the image;
adjusting the brightness of the display based on the brightness gain; and
providing the image for output on the display with the brightness of the display adjusted in accordance with the brightness gain.

2. The computer-implemented method of claim 1, wherein adjusting the brightness of the display based on the brightness gain comprises:
increasing the brightness of the display without changing data that represents the image.

3. The computer-implemented method of claim 1, wherein adjusting the brightness of the display based on the brightness gain comprises:
increasing an amount of power provided to the display based on the brightness gain.

4. The computer-implemented method of claim 1, wherein providing the image for output on the display with the brightness of the display adjusted in accordance with the brightness gain comprises:
generating a local tone mapped image from the image; and
providing the local tone mapped image for output on the display with the brightness of the display adjusted in accordance with the brightness gain.

5. The computer-implemented method of claim 1, wherein determining a brightness gain that reflects an amount to adjust brightness of a display based on both the amount of brightness in the image and the amount of contrast in the image comprises:
determining an amount of brightness of an environment of the display; and
determining the brightness gain that reflects the amount to adjust brightness of the display based on (i) the amount of brightness in the image, (ii) the amount of contrast in the image, and (iii) the amount of brightness of the environment of the display.

6. The computer-implemented method of claim 1, wherein determining a brightness gain that reflects an amount to adjust brightness of a display based on both the amount of brightness in the image and the amount of contrast in the image comprises:
determining an adjusted amount of brightness in the image based on the amount of contrast in the image; and
determining the brightness gain from the adjusted amount of brightness in the image.

7. The computer-implemented method of claim 1, wherein determining an amount of brightness in the image comprises:
determining an average of brightnesses of each pixel in the image.

8. The computer-implemented method of claim 1, wherein determining an amount of contrast in the image comprises:
determining an amount of variance in brightnesses for pixels in the image.

9. The computer-implemented method of claim 1, wherein determining an amount of dark pixels and an amount of light pixels in the image satisfies contrast level criteria for a particular contrast level comprises:
determining a high amount of contrast in the image in response to determining a percentage of pixels that are dark in the image and a percentage of pixels that are light in the image are both greater than a particular threshold.

10. The computer-implemented method of claim 1, wherein determining an amount of dark pixels and an amount of light pixels in the image satisfies contrast level criteria for a particular contrast level comprises:
determining a low amount of contrast in the image based on determining a percentage of pixels that are dark in the image is less than a particular threshold and the percentage of pixels that are light in the image is above the particular threshold.

11. The computer-implemented method of claim 1, wherein determining an amount of dark pixels and an amount of light pixels in the image satisfies contrast level criteria for a particular contrast level comprises:
determining a medium amount of contrast in the image in response to determining a percentage of pixels that are dark in the image is less than a particular threshold and the percentage of light pixels is less than the particular threshold.

12. The computer-implemented method of claim 1, comprising:
determining that the image is no longer to be output on the display; and
in response to determining that the image is no longer to be output on the display, adjusting the brightness of the display to the brightness of the display before the image was output.

13. A system comprising:
one or more computers and one or more storage devices storing instructions that are operable, when executed by the one or more computers, to cause the one or more computers to perform operations comprising:
obtaining an image;
determining an amount of brightness in the image;
determining an amount of contrast in the image, including determining an amount of dark pixels in the image and an amount of light pixels in the image satisfies contrast level criteria for a particular contrast level;
determining a brightness gain that reflects an amount to adjust brightness of a display based on both the amount of brightness in the image and the amount of contrast in the image;
adjusting the brightness of the display based on the brightness gain; and
providing the image for output on the display with the brightness of the display adjusted in accordance with the brightness gain.

14. The system of claim 13, wherein adjusting the brightness of the display based on the brightness gain comprises:
increasing the brightness of the display without changing data that represents the image.

15. The system of claim 13, wherein adjusting the brightness of the display based on the brightness gain comprises:
increasing an amount of power provided to the display based on the brightness gain.

16. The system of claim 13, wherein providing the image for output on the display with the brightness of the display adjusted in accordance with the brightness gain comprises:
generating a local tone mapped image from the image; and
providing the local tone mapped image for output on the display with the brightness of the display adjusted in accordance with the brightness gain.

17. The system of claim 13, wherein determining a brightness gain that reflects an amount to adjust brightness of a display based on both the amount of brightness in the image and the amount of contrast in the image comprises:
determining an amount of brightness of an environment of the display; and
determining the brightness gain that reflects the amount to adjust brightness of the display based on (i) the amount of brightness in the image, (ii) the amount of contrast in the image, and (iii) the amount of brightness of the environment of the display.

18. The system of claim 13, wherein determining a brightness gain that reflects an amount to adjust brightness of a display based on both the amount of brightness in the image and the amount of contrast in the image comprises:
determining an adjusted amount of brightness in the image based on the amount of contrast in the image; and
determining the brightness gain from the adjusted amount of brightness in the image.

19. A non-transitory computer-readable medium storing instructions executable by one or more computers which, upon such execution, cause the one or more computers to perform operations comprising:
obtaining an image;
determining an amount of brightness in the image;
determining an amount of contrast in the image, including determining an amount of dark pixels in the image and an amount of light pixels in the image satisfies contrast level criteria for a particular contrast level;
determining a brightness gain that reflects an amount to adjust brightness of a display based on both the amount of brightness in the image and the amount of contrast in the image;
adjusting the brightness of the display based on the brightness gain; and
providing the image for output on the display with the brightness of the display adjusted in accordance with the brightness gain.

\* \* \* \* \*